United States Patent [19]

Moeglich

[11] 4,124,458
[45] Nov. 7, 1978

[54] MASS-TRANSFER MEMBRANE AND PROCESSES USING SAME

[75] Inventor: Karl Moeglich, Dunedin, Fla.

[73] Assignee: Innova, Inc., Clearwater, Fla.

[21] Appl. No.: 814,715

[22] Filed: Jul. 11, 1977

[51] Int. Cl.² .................... C25B 13/04; C25C 7/04
[52] U.S. Cl. ............................ 204/98; 204/105 R;
204/149; 204/150; 204/151; 204/180 R;
204/180 P; 204/252; 204/253; 204/257;
204/283; 204/295; 204/296; 204/301
[58] Field of Search .............. 204/296 (U.S. only),
204/295, 296, 98, 149–153, 180, 252, 258, 282, 301

[56] References Cited

U.S. PATENT DOCUMENTS

| | | | |
|---|---|---|---|
| 585,387 | 6/1897 | Kellner | 204/296 |
| 2,827,426 | 3/1958 | Bodamer | 204/98 |
| 3,258,414 | 6/1966 | Gregor et al. | 204/296 X |
| 3,356,607 | 12/1967 | Eisenmann et al. | 204/301 |
| 3,694,281 | 9/1972 | Leduc | 204/296 X |
| 3,755,308 | 11/1973 | Yasuda | 210/23 |
| 3,979,274 | 9/1976 | Newman | 204/195 B |
| 4,003,818 | 1/1977 | Juillard et al. | 204/296 |

Primary Examiner—F.C. Edmundson
Attorney, Agent, or Firm—Cushman, Darby & Cushman

[57] ABSTRACT

A porous layer is provided on one or both surfaces of a mass-transfer membrane to enhance or modify the passage of ions. The membrane may be a film of any of a variety of polymeric materials, and the porous layer may be a surface layer on the membrane or a separate porous structure placed in contact therewith. The porous layer or layers render certain normally ion-impermeable polymeric films capable of passing ions in an electrodialysis-type system.

27 Claims, 6 Drawing Figures

MASS-TRANSFER MEMBRANE AND PROCESSES USING SAME

This invention relates to improvements in mass-transfer systems in which ions and/or molecules pass through a membrane assembly from one body of liquid to another.

BACKGROUND OF THE INVENTION

Membrane materials used for chemical separation should be as thin as possible to increase the diffusion rate, mechanically strong to survive pressure and erosion conditions, chemically inert to the electrolytes used, have a very low hydraulic permeability to minimize unwanted diffusion, insensitive to temperature extremes likely to be encountered, immune from swelling or other dimensional changes, and of low cost. Further, membranes should be immune to organic fouling, and should, in many applications, be highly ion-selective. In addition, where used in any electro-dialysis process, the membrane should have a low electrical resistance permitting a high current density, and should have a high dielectric constant to eliminate problems of electric breakdown.

Efforts in the past have attempted to find materials which will satisfy the above requirements to the greatest extent possible, with optimization directed toward various specific applications.

For example, reverse osmosis membranes must withstand pressures up to 1000 psi. Such membranes are usually permeable only to water, and accordingly are not used for separating other components of a solution, as is often required.

Membranes used in the production of sodium hydroxide are hydraulically permeable, allowing considerable salt to pass through and thus contaminate the desired product. Membranes which will prevent such contamination and withstand the chemical conditions in the cell have not been available in the past.

Membranes used for ion selection, often called ion-exchange or permselective membranes, are expensive and are subject to organic fouling. Further, the selectivity, while necessary in a particular application, precludes the use of such membranes in applications where non-selectivity is desired.

Membranes used for osmotic (dialysis) processes are limited to those materials which exhibit high permeability to the constituents desired to be transferred through the membranes. Accordingly, the materials available for such membranes are limited in variety and hence are limited in mechanical and chemical properties.

In any membrane exposed to an electrolyte containing organic matter or other high molecular weight material, such material may be selectively absorbed by the membrane, causing clogging which reduces the desired permeability, and may cause the surface to become hydrophobic, thereby preventing the transport of water across the membrane.

Most of the above-mentioned problems associated with dialysis, reverse osmosis, and electrodialysis are a result of the limited range of materials available for membranes which have permeabilities high enough for practical purposes.

SUMMARY OF THE INVENTION

In accordance with the broad concept of the present invention, the passage of mass in the form of molecules and/or ions through a film of membrane material is altered by providing on one or both sides of the film a porous layer capable of allowing liquid from the adjacent body of liquid to contact the film. Altering the passage of the particles of mass includes, for example, changing the ease or efficiency with which particles will pass through the film, changing the selectivity of the film with respect to certain particles and rendering certain ion-impermeable films capable of passing ions. The film may be made of a known membrane material such as those conventionally used in making membranes for dialysis, electrodialysis and reverse osmosis, or it may be any one of several films which are by themselves practically impermeable to the passage of ions in solution (and hence not heretofore used as ion-transfer members), but which are rendered ion-permeable by the porous layer, for example, polyethylene, Saran (a polyvinylidene chloride) and Mylar (a polyester).

Therefore, it is a broad object of the invention to provide an improved mass-transfer membrane assembly which comprises a film which by itself may be either permeable or essentially impermeable to passage of particles and at least one porous layer, essentially inert to its operative environment, on the operative portion of at least one surface of the film.

The invention is particularly concerned with electrochemical membranes and their use in electrochemical systems of the kind in which ion-transfer through the membrane takes place under the influence of an electrical potential applied between electrodes disposed in an electrolyte on either side of the membrane. It is therefore a further object of the invention to provide an electrochemical cell and an electrochemical process wherein at least two electrolyte-containing chambers are provided with electrodes and are separated by a membrane assembly which comprises a film of electrically insulating material and a porous electrically insulating layer on the operative portion of at least one surface of the film. It has been found that a number of low-cost synthetic polymeric films, such as films of polyethylene, nylon, polyvinyl chloride, Tedlar (a polyvinyl fluoride), Saran and Mylar are particularly useful. For example, a polyethylene film which will pass no electric current when used alone in an electrochemical cell, will pass up to one amp or more per square centimeter, the limit being film heating, when provided with a porous layer as described herein.

The film may be comprised of permeable or of impermeable material; the normal permeability of the film is not a factor in the invention.

DETAILED DESCRIPTION

The thickness of the films used in the membrane assemblies of the invention is not critical and may be in range of conventional mass-transfer membranes. Typically the thickness may very from one micron up, with a preferred range being 5 to 10 microns. As described above, the films themselves may be known ion-transfer films or films of various synthetic polymeric materials not heretofore used for ion-transfer membranes.

The porous layer which alters the ion-transfer properties of the film may be provided on one or both surfaces of the film. It is intended that the identification of the porous layer as being "on" the film be interpreted broadly, to include separate porous structures which are in tight contact with or loose contact with the film as well as coatings adhered to the film and surface treatments of the film which render the surface porous.

Separate porous structures include preformed sheets of filter paper, asbestos paper, woven and non-woven fabrics of natural and/or synthetic fibers, glass fiber, sintered particulate refractory material, open-cell polymeric foams and gelatin. Coating-type porous layers may be deposited on the film by chemical or vacuum deposition, by electrostatic flocking or by allowing suspended solid matter to settle on the film when placed horizontally in a liquid bath. Certain chemical precipitates may also be used as the porous layer. Surface treatments to form a porous layer include chemical etching or leaching of embedded soluble materials.

The physical characteristics of the porous layer may vary widely. The pore size must be sufficient to permit a film of liquid from the body of liquid adjacent the membrane assembly to contact the ion-transfer film but insufficient to permit free flow of liquid between the ion-transfer film and the body of liquid. Generally pore size may vary from 0.1 microns to 5 millimeters, with a preferred range of 20 to 100 microns. The pore size is dictated in part by practical considerations of permeability, mechanical strength and stability, and chemical inertness.

The thickness of the porous layer may vary from the thickness of a few molecules of water up to several millimeters, a preferred range being 0.01 mm to 1.0 mm. In an electrochemical environment the thickness is dictated by the voltage drop which is tolerable for practical purposes. The thickness should be greater than the average pore size.

In an electrochemical environment both the film and the porous material are normally electrically insulative, that is, they do not act as electrodes in the electrolyte. The film material, if made from the plastics given as examples, is normally impermeable to water. That is, hydrostatic pressure alone will not cause water to pass through the film to any practical extent. It has been found unexpectedly that a membrane assembly as described above will pass an electric current when the assembly is used in an electrolytic cell, even though the film component alone may be one which will not pass a current under the same conditions. For example, a polyethylene film which will pass no electric current when used alone in an electrochemical cell, will pass up to one amp or more per square centimeter, the limit being film heating, when provided with a porous layer as described above.

When the membrane assembly is to be used in an electrolytic cell it is generally desirable to "condition" the membrane assembly to increase the permeability. This is accomplished by operating the membrane assembly at a higher voltage initially in the electrolyte. The current gradually increases to a steady state value indicating an increased permeability. This "conditioning" is beneficial, but not essential to the invention. The conditioning can be done as a separate process if desired to provide pre-conditioned membrane assemblies.

Some film materials exhibit selective ionic permeability when used according to the invention; therefore, it may be desirable to test several types of materials for each application and select the most suitable.

The membrane assembly includes at least one film and at least one porous layer but may include a plurality of films and a plurality of layers. In one particularly useful embodiment a film is sandwiched between two porous layers to form an assembly which will pass ions in both directions through the assembly. Alternatively a one-film, one-layer assembly can be used if desired; however the permeability of the assembly will generally be less than if both sides of the film are treated or in contact with a porous layer. Several layers can be utilized as desired, for example, two or more layers of paper or two or more layers of film or both. Also, combinations of materials may be employed in any one membrane assembly such as two or more types of plastic film and two or more types of paper, if paper is used as the material contacting the film. Further, multiple alternating layers may be used as desired.

A preferred embodiment for general testing purposes consists of one plastic film of thickness from 10 to 50 microns sandwiched between layers of paper such as filter paper or asbestos paper, with the several layers being held together in contact by non-conductive backing plates such as plastic sheets with a multiplicity of small holes, 1 to 3 mm diameter, formed or drilled in the plates provide fluid access to the membrane while retaining mechanical rigidity of the plate. An open area of at least 50% of the total plate area is preferred. To maximize the open area while maintaining strength, honeycomb type plates, plates with reinforcing bars or rods, layers of plates with special pores, holes, and rods, and other similar methods may be used. It is desirable to minimize the thickness of the reinforcing plates especially when using liquids not having high conductivity, since the electrode spacing is thus minimized, the cell voltage is reduced, and the power requirement reduced. For high current density use, the backing plates may be used to keep the temperature of the membrane materials within desirable limits by using the plate as a heat exchanger with the circulation of a coolant fluid through closed channels formed in the plate or plates.

The use of backing plates may also be dispensed with entirely where the membrane layers are formed into an integral assembly, and then formed into a bag or pouch which contains one electrode and an electrolyte, with the bag and electrode then being immersed into another cell containing the other electrode and the other electrolyte.

No critical pressure between the film and porous layer is required, although the film and layer must be very closely spaced or in contact throughout the entire film area which is to be utilized. When the porous layer is a separate sheet, the film and sheet may be held together mechanically in any of a variety of ways. They may be held together by mechanical supports such as porous or perforated plates usually of an inert substance such as plastic. Electrodes may be used as the support members if properly formed to allow fluid access to the membrane. The membrane assembly may also be held together by bonding methods such as adhesives or heat seals; by mechanical methods such as pins, rivets, screws, clamps, or plugs; by manufacturing methods which would result in an assembly of the elements in a single package for example as in the use of a plastic film having a roughened, coated, fuzzy or hairy surface to perform the same function as a porous paper layer; or by hydraulic methods which utilize the dynamic or static pressures of fluids to maintain the layers in contact. Where the configuration allows, gravity alone may be sufficient to hold one layer to another, for example where the layers are horizontal.

Backing plates may be omitted if the membrane and the porous layer or layers are sufficiently rigid to maintain the layers in contact and to withstand the flow conditions in the cell.

Selective permeability of the membrane assembly to various ion species may be achieved by several means, for example, by selection of materials used for the film or porous layer, by selection of the thickness of the film or porous layer, by using a multiplicity of films and porous layers, and by adjustment of the voltages used between electrodes.

Voltages between 0.15 volts and 1000 volts may be employed, but more typical voltages used are 2 volts to 10 volts per membrane assembly.

Current densities at the membrane may vary from 0.001 amps per $cm^2$ to 2.0 amps per $cm^2$ with the preferred range from $0.15A/cm^2$ to $0.5A/cm^2$.

The improvements of the invention find utility in recovering uranium, other heavy metals, and noble metals from waste waters, acids, or caustic solutions. The improvements of the invention may also be used in metal recovery from industrial processes, and in the purification of water to remove undesirable contaminants, such as in the purification of sea water to produce potable water, and generally in the purification of waste waters containing valuable or undesirable ionic constituents. Waste waters containing from a few parts per billion up to twenty percent or more of contaminants may be purified to undetectable limits.

Acid or caustic solutions may be concentrated or purified. For example, salt in sodium hydroxide can be removed by transferring the chlorine out of the solution, or by transferring the sodium out of the solution and reconcentrating it as a catholyte. In the latter case, the sodium hydroxide is also purified of organic material, and the concentration level of the NaOH can be increased to at least 50%.

The invention will be further understood from the following more detailed description taken with the drawings in which.

Figure 1:
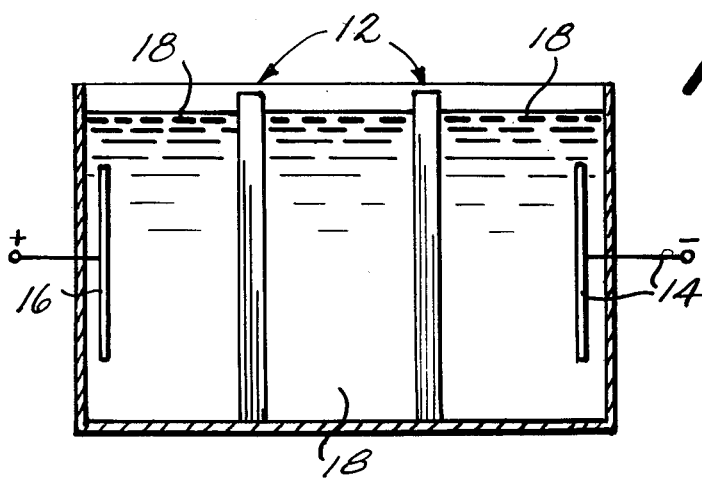
FIG. 1 is a schematic vertical cross-sectional view of an electrochemical reaction cell utilizing two membrane assemblies according to the present invention.

Referring to FIG. 1, there is shown schematically an electrochemical cell including a tank 10, two spaced-apart membrane assemblies 12, a cathode 14, and an anode 16. The membrane assemblies 12 divide the tank 10 into three compartments, each of which contains an electrolyte 18.

Figure 2:
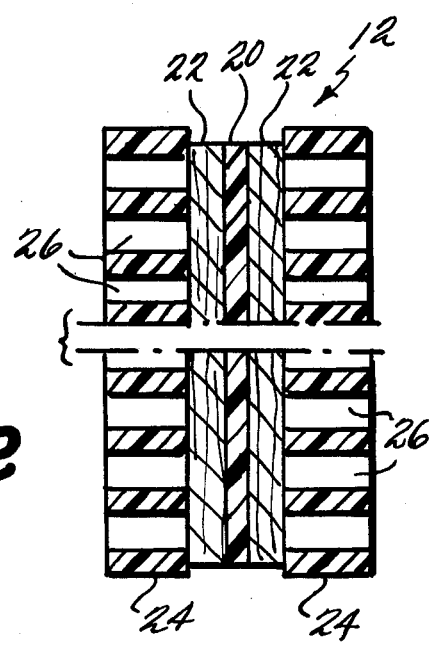
FIG. 2 is a schematic cross-sectional view, on an enlarged scale, of one of the membrane assemblies of FIG. 1.

FIG. 2 schematically illustrates the construction of one of the membrane assemblies 12; the thicknesses of the membrane components are greatly enlarged for explanatory purposes. As shown, the assembly 12 includes a film 20 of electrically insulating material such as polyethylene. The film 20 is sandwiched between two layers 22 of porous electrically insulating material such as filter paper. The film 20 and layers 22 are held in contact over the entire front and back surfaces of the film 22 by backing plates 24 such as rigid sheets of polyethylene. The backing plates 24 are provided with a large number of relatively large holes 26 which allow contact of the electrolyte 18 with the layers 22. The assembly 12 is held together in any suitable way such as by clips, tape, bolts or other fasteners, none of which is shown. The fasteners are constructed of materials which are inert under the reaction conditions in the cell. Means (not shown) is provided for applying a direct current potential difference to the electrodes 14 and 16.

Figure 3:
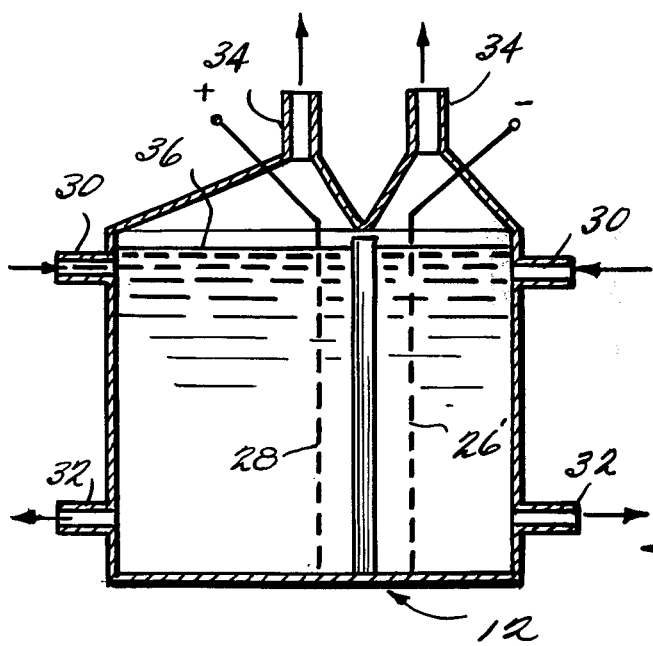
FIG. 3 is a schematic vertical cross-sectional view of a second embodiment of an electrochemical reaction cell.

FIG. 3 illustrates an electrochemical cell having a membrane assembly 12 of the kind described above disposed between a perforated cathode 26' and a perforated anode 28. Each chamber of the cell has an electrolyte inlet 30, an electrolyte outlet 32 and a gas outlet hood 34 disposed above the electrolyte level 36.

Figure 4:
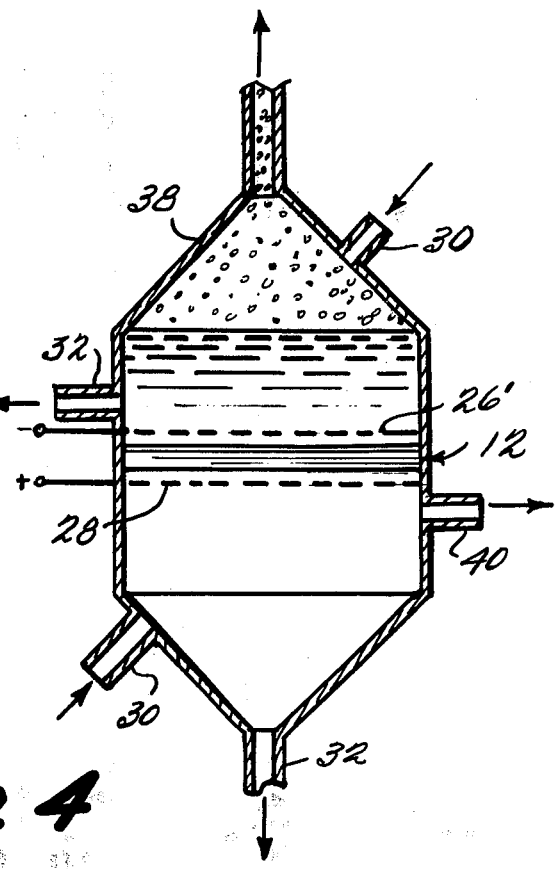
FIG. 4 is a schematic vertical cross-section of a third embodiment in which the membrane is disposed horizontally.

FIG. 4 illustrates an electrochemical cell in which a membrane assembly 12 as described above, is disposed horizontally between horizontal perforated electrodes 26' and and 28. Each of the upper and lower chambers has an electrolyte inlet 30 and an electrolyte outlet 32. A gas collection hood 38 is located above the electrolyte level 36 in the upper chamber. The removal of evolved gas through an outlet 40 from the lower surface of the membrane assembly 12 is essential to prevent the gas from screening the membrane from the electrolyte. Such collection may be achieved by several methods such as a gas screen, fluid flow, cell inversion, or a curved or slanted membrane surface. A gas screen is a fine mesh screen or fabric which will not pass gas bubbles, but will allow liquid to pass. Most fine mesh screens will accomplish this function to a sufficient extent to allow the gas bubbles to coalesce and be removed by other means such as tilting the screen and collecting the gas at the upper end. Fluid flow can be used to sweep the gases to one side for separation by conventional means such as settling or centrifugation. The cell may be periodically inverted for gas collection from alternate ends. The membrane assembly can be slanted or made concave or convex to guide the gas bubbles to a convenient collection point. Other such methods are well known to those familiar with the art and are not essential to the inventive concept herein described.

It is to be understood that in any of the embodiments more than one membrane assembly may be used, and that one or more electrodes may be used between the membrane assemblies as desired for specific ionic transfer control and pH control.

EXAMPLES

Example 1. No current using plain plastic film.

An electrolytic cell, equipped with two electrodes, was divided into two chambers by a membrane consisting of a film of polyethylene 0.0013 cm thick (½ mil). The anolyte was deionized water; the catholyte was dilute phosphoric and sulfuric acid with pH = 1.5. A potential of 150 volts D.C. was applied to the electrodes. During and after 8 hours of voltage applied, no current was measured, indicating a membrane resistance in excess of several megohms. The pH of the deionized water did not change. This test shows that under normal conditions, a film of polyethylene plastic will not serve as a membrane.

Example 2. Current flow using film plus paper.

The same cell as in Example 1 was used, with the same film material, except that the film was covered on both sides with filter paper. The electrolytes were the same as in Example 1. With a potential between the electrodes of 30 volts D.C. the current increased to 0.5 amp within 8 hours. After 350 amp-minutes, the deionized water in the anode compartment changed in pH from 7 to 0, while the acid in the cathode compartment changed in pH from 1.3 to 7.5, showing a transfer of the negative phosphate and sulfate ions through the membrane. Each chamber held 200 ml of electrolyte. The anode was platinum; the cathode, graphite. The active membrane area was 13 cm$^2$.

Example 3. Effects of Non-Wettable Porous Layers.

The same cell as in Example 2 was used, except that the film was covered on both sides with a polyester felt material having a negative angle of wetting; that is, the surface of the material repelled water, however water did flow through the felt. With a potential of 150 volts applied, no current was noted over a period of 21 hours. The same experiment was repeated using a teflon-coated glass fiber mat. With 40 volts applied, the current started at 47 microamps and increased to 530 microamps after 14 hours. The pH of the anolyte decreased from 7.1 to 6.9. This example shows that the use of non-wetting porous materials does not decrease the membrane resistance below 75,000 ohms whereas the use of wettable porous materials, for the same cell and electrode geometry, as shown in Example 2, decreases the membrane resistance to well under 50 ohms.

Example 4. Membrane resistance.

Figure 5:
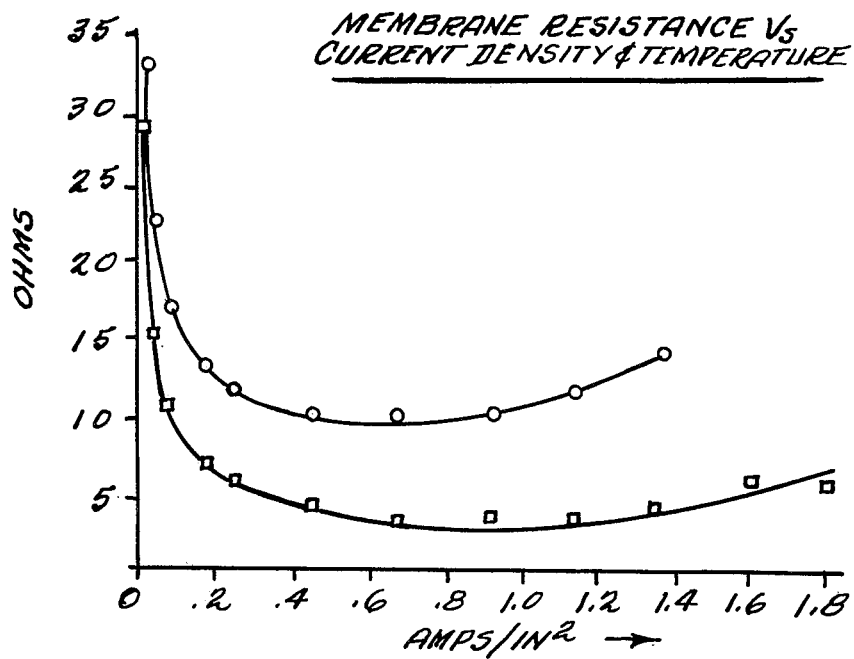
FIG. 5 is a plot of electrical resistance versus current density for a polyethylene film.

The membrane resistance decreases with temperature and with an increase in current density, up to about 1 amp/in$^2$ (0.15A/cm$^2$). Using a ½ mil polyethylene film between filter papers, 400 cm$^3$ electrolyte, 28 cm$^2$ membrane area, graphite electrodes 1 cm diameter, anolyte $H_3PO_4 + H_2SO_4$ with pH = 0; catholyte $H_3PO_4 + H_2SO_4$ with pH = 0.1; at 18° C. the membrane resistance was a minimum of 10.8 ohms at a current density of 0.68 amp/in$^2$ (0.105 amps/cm$^2$). The current was 3.0 amps at a voltage of 32.5 volts. FIG. 5 shows the membrane resistance vs. current density. When the electrolyte temperature was increased to 40° C., the membrane resistance decreased further as shown in FIG. 5. Other electrolytes and other cell conditions will result in other values for the optimum current density.

Example 5. Current efficiency.

The actual current efficiency was measured using tap water as the anolyte and a mixture of $H_3PO_4$, $H_2SO_4$, and HF as the catholyte, with a pH of 1.3. The attained current efficiency was 80 to 90% of the theoretical maximum as given by Faraday's Law. This data was obtained from the cell of Example 4, with the electrolytes as given above.

Example 6. Current efficiency.

Figure 6:
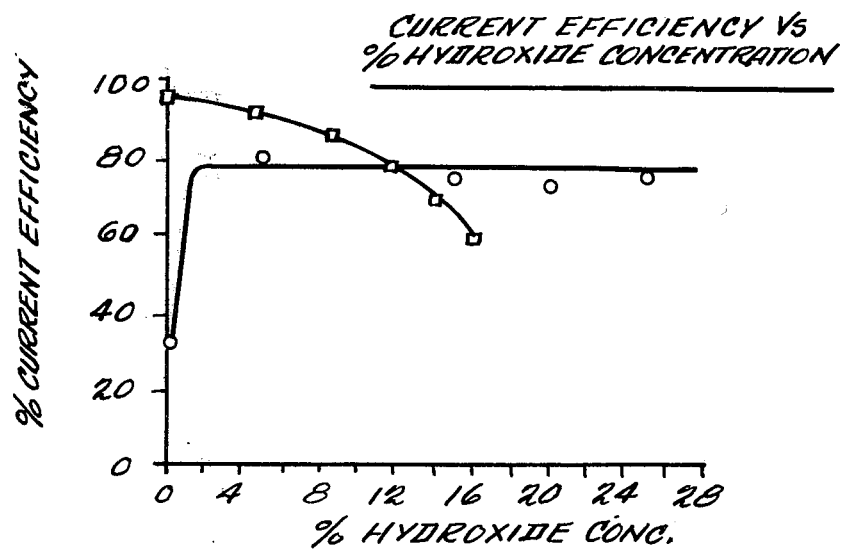
FIG. 6 is a plot of current efficiency versus hydroxide content for a polyethylene film and for a Nafion film.

Example 5 showed a high current efficiency for an acidic electrolyte. This example deals with the current efficiency in a basic electrolyte. Polyethylene film ½ mil thick was used between layers of filter paper as the membrane. The anolyte was 400 ml of 5% KOH; the catholyte was 400 ml of deionized water. The potassium ions were transferred across the membrane into the catholyte where purified KOH was built up to a concentration of 25% before the test was discontinued. The initial low current efficiency shown in FIG. 6 is due to the "conditioning" process of the new membrane. For comparison purposes, in this same figure is shown the current efficiency of a new ion exchange membrane "NAFION" by DuPont, designed for sodium hydroxide use. It may be noted from this figure that even without cell optimization, the membrane of this invention is superior to "NAFION" at the higher levels of hydroxide concentration.

What is claimed is:

1. In an electrochemical process wherein ions in one body of liquid pass through an operative portion of an ion-permeable membrane assembly into another body of liquid, the improvement which comprises using an ion-permeable membrane assembly which comprises
    (a) a film of electrically insulating material, wherein said film is substantially impermeable to water, is substantially ion-impermeable and has a thickness of 1 micron to 1 millimeter;
    (b) and at least one layer of porous material disposed on at least one surface of said film wherein the layer of porous material has a thickness which ranges from 0.01 to 1.0 millimeters, and wherein the thickness of said layer is greater than the average pore size of the pores of said porous material and wherein the material of said porous layer is incapable of acting as an electrode,
        wherein each of said film and said porous material is substantially chemically inert under the conditions existing in the cell.

2. The process of claim 1, wherein said film is composed of a plastic material.

3. The process of claim 1, wherein said film is polyethylene, polyvinylidene chloride, polyvinyl fluoride, nylon or polyester.

4. The process of claim 1, wherein said ion-permeable membrane assembly comprises a plurality of films of (a) alternating with a plurality of layers of (b).

5. The process of claim 1, wherein the dimensions of said pores range from 20 to 100 microns.

6. The process of claim 1 wherein said film is disposed between, and is in contact with, two layers of said porous material.

7. The process of claim 1, wherein said film is polyethylene.

8. The process of claim 1, wherein said material of said layer of porous material is an electrically insulating material.

9. In an electrochemical cell which comprises at least two compartments, said compartments being separated by an ion-permeable membrane assembly, wherein said membrane assembly comprises
    (a) a film of electrically insulating material, wherein said film is substantially impermeable to water, is substantially ion-impermeable and has a thickness of 1 micron to 1 millimeter;
    (b) and at least one layer of porous material disposed on at least one surface of said film wherein the layer of porous material has a thickness which ranges from 0.01 to 1.0 millimeters and wherein the thickness of said layer is greater than the average pore size of the pores of said porous material and wherein the material of said porous layer is incapable of acting as an electrode,
        wherein each of said film and said porous material is substantially chemically inert under the conditions existing in the cell.

10. The cell of claim 9, wherein one of said two compartments is provided with an anode and the other of said two compartments is provided with a cathode.

11. The cell of claim 9, wherein the film of said ion-permeable membrane assembly is composed of a plastic material.

12. The cell of claim 9, wherein the film of said ion-permeable membrane assembly is polyethylene, polyvinylidene chloride, polyvinyl fluoride, nylon or polyester.

13. The cell of claim 9, wherein the dimensions of said pores range from 20 to 100 microns.

14. The cell of claim 9, which is filled with an electrolyte.

15. The electrochemical cell of claim 9, wherein said film is polyethylene.

16. The cell of claim 1, wherein said material of said layer of porous material is an electrically insulating material.

17. The cell of claim 9, wherein two layers of said porous material are disposed on each surface of said film.

18. A membrane assembly, which divides an electrochemical cell into at least two compartments comprising
    (a) a film of substantially electrically insulating material, wherein said film is substantially impermeable to water, is substantially ion-impermeable and has a thickness of 1 micron to 1 millimeter;
    (b) and at least one layer of porous material disposed on at least one surface of said film, wherein said layer of porous material has a thickness which ranges from 0.01 to 1.0 millimeters, and wherein the thickness of said layer is greater than the average pore size of the pores of said porous material and wherein the material of said porous layer is incapable of acting as an electrode,
    wherein each of said film and said porous material is substantially chemically inert under the conditions existing in the cell.

19. The membrane assembly of claim 18, which comprises a plurality of films of (a) alternating with a plurality of layers of (b).

20. The membrane assembly of claim 18, wherein said film is composed of a plastic material.

21. The membrane assembly of claim 18, wherein said film is polyethylene, polyvinylidene chloride, polyvinyl fluoride, nylon or polyester.

22. The membrane assembly of claim 18, wherein the dimensions of said pores range from 20 to 100 microns.

23. The membrane assembly of claim 18, wherein the material of said layer of porous material is substantially electrically insulative.

24. The ion-permeable membrane assembly of claim 23 which further includes a second layer of said porous material, which is disposed on a second surface of said film.

25. The membrane assembly of claim 18, which is disposed between two electrodes, each of said electrodes being housed in one of said two compartments.

26. The ion-permeable membrane assembly of claim 18, wherein said film is polyethylene.

27. The ion-permeable membrane assembly of claim 18, wherein two layers of said porous material are disposed on each surface of said film.

* * * * *